United States Patent [19]

Shiner

[11] 3,722,070
[45] Mar. 27, 1973

[54] METHOD OF MAKING ROPE FIGURE

[76] Inventor: Leo E. Shiner, 903 Alann Drive, Joliet, Ill. 60435

[22] Filed: Aug. 1, 1969

[21] Appl. No.: 846,872

[52] U.S. Cl. ..................29/433, 29/445, 29/461, 57/3.5, 57/139, 46/156, 46/162
[51] Int. Cl. .............................................B23p 19/04
[58] Field of Search ..46/151, 156, 162; 29/461, 433, 29/445, 241; 57/3.5, 139

[56] References Cited

UNITED STATES PATENTS

| | | | |
|---|---|---|---|
| 1,612,805 | 1/1927 | Francke | 46/156 |
| 1,648,404 | 11/1927 | Kenly | 46/156 |
| 1,911,512 | 5/1933 | Kaufman | 46/156 |
| 2,812,616 | 11/1957 | Ford | 46/151 |
| 3,035,689 | 5/1962 | Arnheiter | 46/156 UX |
| 3,395,484 | 8/1968 | Smith | 46/151 |
| 124,183 | 2/1872 | White | 57/139 |
| 2,753,833 | 7/1956 | Tinsley | 57/139 X |
| 3,009,307 | 11/1961 | Hansen | 57/3.5 |

FOREIGN PATENTS OR APPLICATIONS 122,100    1919    Great Britain..........................46/156

Primary Examiner—Charlie T. Moon
Attorney—Clarence A. O'Brien and Harvey B. Jacobson

[57] ABSTRACT

An animal simulating assemblage of rope components including a single length of twisted strand rope defining the neck, body and tail portions of the simulated animal and having a stiff wire or similar element extending longitudinally therethrough so as to afford sufficient stiffness to the twisted strand rope to enable it to retain the desired shape in which it is bent. Each pair of legs of the simulated animal formed comprises an additional length or section of twisted strand rope having a lengthwise extending stiffening wire or the like extending therethrough and the additional strand of rope is secured to the appropriate portion of the body defining section of rope. The free end of the neck defining end portion of the body rope section includes a rope knot defining an enlargement to simulate a head and the strands of the remote end of the body defining rope section may be unraveled and brushed to simulate a flag tail, if desired. Suitable eyes may be defined by fish bobbers, beads or the like attached to the head defining rope knot and the mouth or tongue of the simulated animal may be simulated by art foam. In addition, appropriate ears may also be formed of art foam or by opposite ends of a single rope strand inserted half-way through a single loop or a plurality of loops of the head defining knot and the opposite ends of the single strand may be brushed in order to simulate shaggy ears if desired.

4 Claims, 8 Drawing Figures

PATENTED MAR 27 1973 3,722,070

Leo E. Shiner
INVENTOR.

BY *Clarence A. O'Brien*
and *Harvey B. Jacobson*
Attorneys

PATENTED MAR 27 1973 3,722,070

Leo E. Shiner INVENTOR.

BY *Clarence A. O'Brien*
and *Harvey B. Jacobson*
Attorneys

METHOD OF MAKING ROPE FIGURE

Although the rope figure illustrated and described hereinafter is in the form of a dog, it is to be understood that various other animals may be similarly formed.

The rope figure has been designed to provide an attractive display piece which may be used in many environments such as a child's toy or as a decorating accessory and is constructed of rope which may be readily dyed the desired color to blend with the environment in which it is to be placed.

Many different types of twisted strand rope may be utilized in constructing the desired figure but if the ultimate color of the figure is to be different from the original color of the rope from which it is formed the figure must be constructed of a material which may be readily dyed.

The main object of this invention is to provide an attractive animal simulating figure for use as a toy, a decorating accessory or an art display.

Another object of this invention is to provide an animal simulating rope figure which may be readily constructed in various sizes according to the size of the twisted strand rope used to form the figure.

A still further object of this invention is to provide a method of making simulated animal figures from sections of rope.

Another object of this invention is to provide a method in accordance with the preceding object and which may be slightly modified in order to accomplish the formation of figures simulating different animals.

A final object of this invention to be specifically enumerated herein is to provide a rope figure which may be readily constructed of rope, dyed to a desired color and educational as to the formation of various knots during its making so as to provide a device that will be economically feasible, readily changeable in color and constructive in the development of dexterity, patience and artistic ability.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
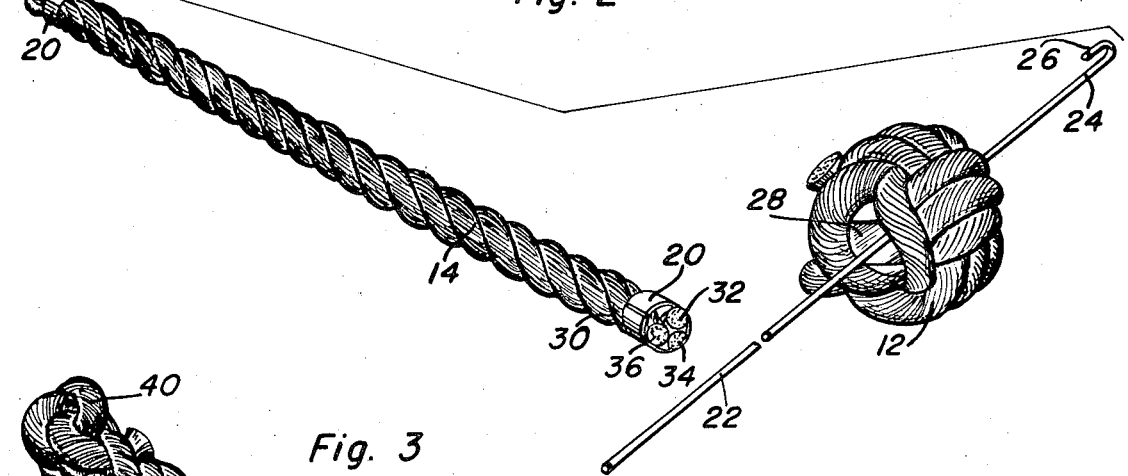
FIG. 2 is an exploded perspective view of two of the four major components utilized in the construction of the simulated animal.
Figure 3:
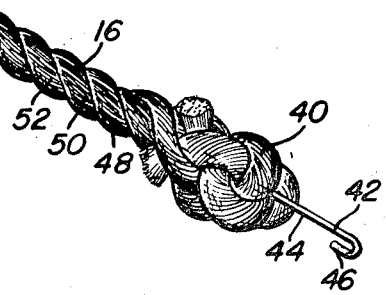
FIG. 3 is a perspective view of a third major component of the animal utilized to define a pair of the legs of the animal.
Figure 4:
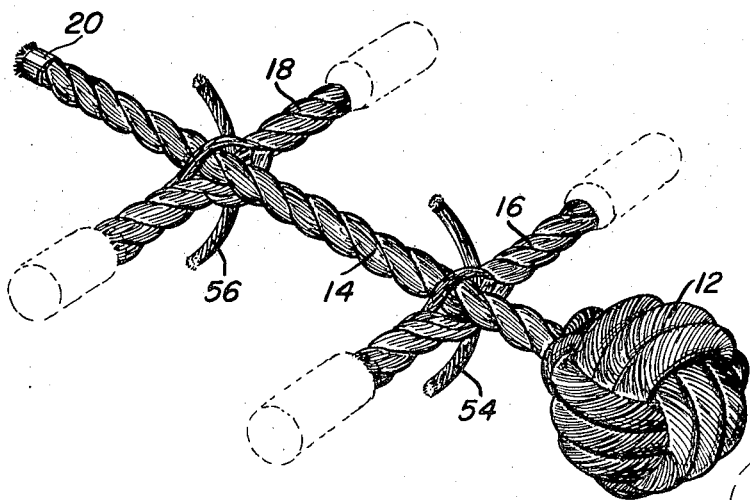
FIGS. 4-8 are sequential perspective views illustrating the various steps which are followed in order to construct the simulated animal illustrated in FIG. 1.
Figure 5:
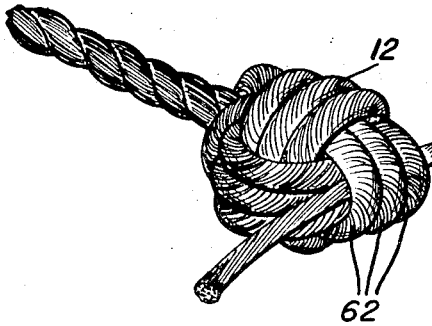
Figure 6:
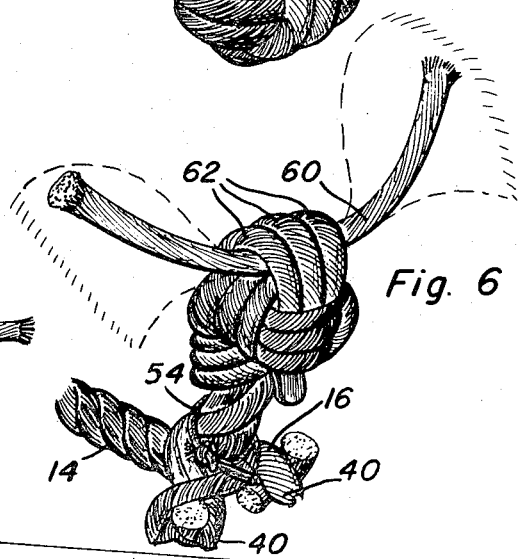
Figure 7:
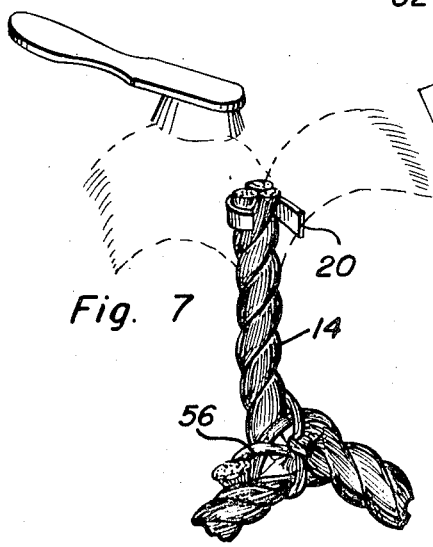
Figure 8:
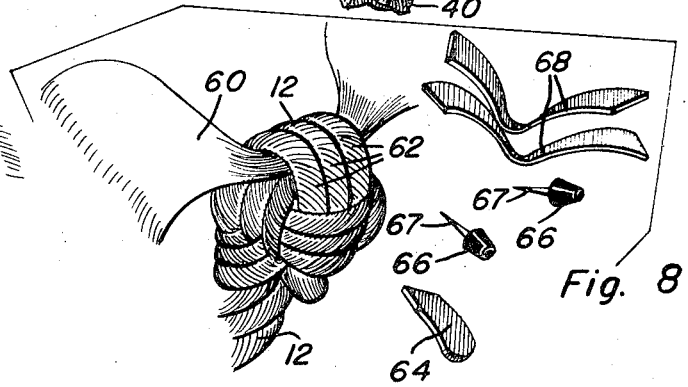

Referring now more specifically to the drawings, the numeral 10 generally designates a completed simulated animal constructed in accordance with the present invention. From FIGS. 2-4 of the drawings it may be seen that four basic components 12, 14, 16 and 18 are utilized to form the animal 10. The component 12 comprises a length of multi-strand rope formed into a monkey knot, the component 14 comprises a length of three strand rope whose opposite ends are whipped as at 20, the component 16 comprises a further length of three strand rope and the component 18 comprises a duplicate of the component 16.

In forming the animal 10, the component 12 is first formed and the opposite ends of the component 14 are whipped. Thereafter, a length of stiff wire 22 has its first end inserted through the monkey fist knot 12. Thereafter, the end 24 is bent so as to define a backturned hook portion 26 and the wire is then pulled in the opposite direction through the monkey fist knot 12 so as to engage the hook with an upper inside portion of the monkey fist knot 12. Thereafter, a wooden or other tapered pin is inserted into the head alongside the end of the wire remote from the hook 26 projecting from the knot 12 so as to form a recess 28 in the monkey fist knot 12. Thereafter, the first end 30 of the component 14 is inserted into the recess 28 and the component 14 is then wrapped around the extended end of the wire 22 by twisting the component 14 in the direction that will open the individual strands thereof. As the individual strands of the component 14 are opened, the component 14 is pressed against the wire causing the wire to lay within the center of the component 14 between the three strands 32, 34 and 36 thereof.

The wire 22 is laid through the center of the component 14 until it is about one inch from the end 36 of the component 14 at which time the remaining portion of the wire 22 is cut off. In this manner, the free end of the wire 22 is fully enclosed within the component 14 between the strands 32, 34 and 36 thereof.

The component 16 is formed by forming a pair of crown knots 40 in the opposite ends thereof and a second length of wire 42 then has one end 44 thereof inserted through one of the crown knots 40 with the remainder of the wire 42 passing outwardly between the strands of the component 16 at the inner end of the crown knot. The outer end of the wire 44 then has a reversely bent hook 46 formed therein such as the hook 26 and the wire 42 has its hooked end thereof pulled back into the adjacent crown knot 40. Thereafter, the component 16 is twisted so as to open the strands thereof and the remaining portion of the wire 42 is laid between the three strands 48, 50 and 52 of the component 16.

The component 18 is then formed in the same manner and the components 16 and 18 are each in turn applied to the component 14 by forcing a tapered pin between the strands of the components 16 and 18 at their mid-points so as to form an opening through the components 16 and 18 through which the component 14 may have its end 38 inserted. Thereafter, individual smaller strands 54 and 56 may be utilized to tie the components 16 and 18 to the component 14, see FIG. 4.

Figure 1:
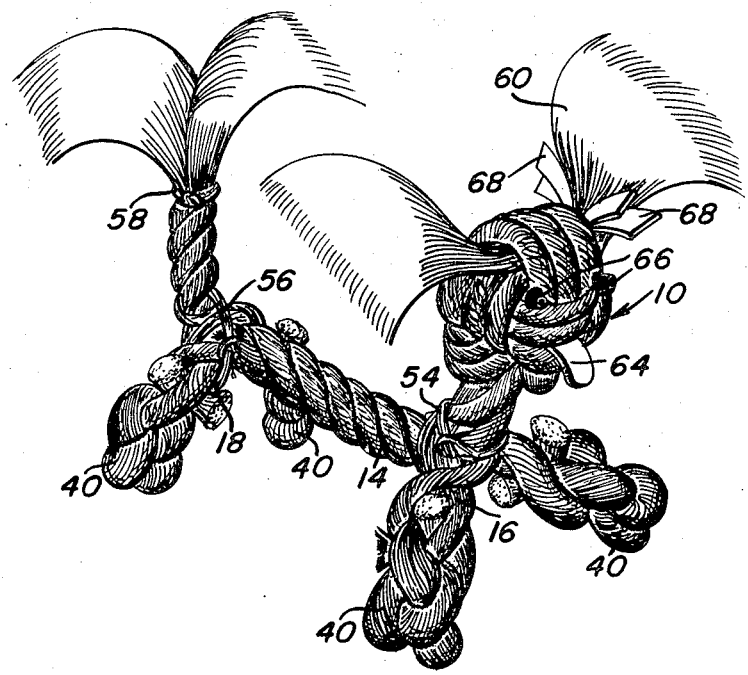
FIG. 1 is a perspective view of a completed simulated animal constructed in accordance with the present invention.

Thereafter, a smaller strand 58 similar to strands 54 and 56 is tied about the component 14, see FIG. 1, at a point spaced approximately 1½ inch from the component 18 and the whipping 20 is removed. Then, a single strand 60 is inserted under the top three strands 62 of the monkey knot and the components 14, 16 and 18 may be bent into the configurations thereof illustrated in FIG. 1.

The component 16 is positioned approximately three inches from the monkey knot or the component 12 and the component 18 is positioned approximately 4 inches rearward of the component 16. Thereafter, the free end of the component 14 projecting beyond the tied strand 58 is unraveled and brushed so as to form a flag-type tail. Thereafter, the exposed ends of the strand 60 are also unraveled and brushed so as to form the ears of the animal. Finally, a piece of art foam 64 is applied to the knot 12 to form the tongue and a pair of sinkers or beads 66 and the like are secured in any convenient manner, such 12 by pins 67, to the knot 12 in order to form the eyes. Thereafter, pieces of ribbon 68 may be tied about one of the unraveled and brushed ends of the strand 60 so as to form a hair ribbon.

It will be appreciated that the size of the animal 10 may be readily varied merely by using larger diameter rope with the various sections of rope and strands being increased in length as the diameter of the rope is increased. Further, if the animal 10 is to be dyed a particular color, the dying process is best carried out before the attachments 64, 66 and 68 are applied.

It is also to be noted that a larger body portion could be formed if the components 16 and 18 were made longer and their mid-portions closely paralleled and were secured to the mid-portion of the component 14 so that each component 16 and 18 would form a pair of legs on the same side of the body of the animal to be formed. Also, various knots other than crown knots and monkey fist knots may be utilized to form the feet and head portions of an animal to be simulated.

Among the other various animals which may be formed by practicing the invention described hereinbefore are a chicken or "road runner" figure, an alligator, a monkey and a horse.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. The method of forming an assemblage of rope components simulating the body and legs of an animal, said method comprising the steps of stiffening progressively relatively untwisting longitudinally adjacent spaced portions of a first section of twisted strand rope and progressively laying a small diameter stiff but bendable elongated stiffening member between the relatively untwisted strands of said first section so as to position said stiffening member within said section between the twisted strands thereof, laying a second small diameter elongated stiffening member between the strands of a second section of twisted strand rope in the same manner, and attaching a mid-portion of said second section to a mid-portion of said first section by separating one of the strands of one of said sections from the other strands thereof and inserting the other section through the opening defined between said one strand and said other strands of said one section.

2. The method of claim 1 including the steps of forming an enlarged knot of rope and attaching said enlarged knot of rope on one end of said first section prior to laying said stiffening member between said strands of said first section.

3. The method of claim 2 wherein the step of attaching said enlarged knot on said one end of said first section includes the step of forming a reversely bent hoop on a first terminal end of said stiffening member, inserting the other end of said stiffening member through said knot so as to embed the reversely bent hook with said knot with the hook engaged with one of the internal loops of the knot, spreading the loops of the knot to define an outwardly opening elongated blind recess along the other end portion of the stiffening member where it projects outwardly from said knot, and inserting said one end of said first section in said recess prior to the step of laying the stiffening member between the strands of said first section.

4. The method of claim 1 including the step of forming feet defining legs on the opposite ends of said second section of rope.

* * * * *